United States Patent
Wang

(10) Patent No.: US 10,082,986 B2
(45) Date of Patent: Sep. 25, 2018

(54) IMAGE FORMING APPARATUS WITH MULTIPLE PRINT ENGINES FOR DISTRIBUTED PROCESSING OF SINGLE PRINT JOB

(71) Applicant: RISO KAGAKU CORPORATION, Tokyo (JP)

(72) Inventor: Yongning Wang, Ibaraki (JP)

(73) Assignee: RISO KAGAKU CORPORATION, Tokyo (JP)

( * ) Notice: Subject to any disclaimer, the term of this patent is extended or adjusted under 35 U.S.C. 154(b) by 0 days.

(21) Appl. No.: 15/686,673

(22) Filed: Aug. 25, 2017

(65) Prior Publication Data

US 2018/0088873 A1    Mar. 29, 2018

(30) Foreign Application Priority Data

Sep. 28, 2016   (JP) ................................ 2016-189099

(51) Int. Cl.
*G06F 3/12*   (2006.01)
*H04N 1/00*   (2006.01)

(52) U.S. Cl.
CPC ............ *G06F 3/1204* (2013.01); *G06F 3/121* (2013.01); *G06F 3/123* (2013.01); *G06F 3/124* (2013.01); *G06F 3/1279* (2013.01); *G06F 3/1281* (2013.01); *G06F 3/1282* (2013.01); *G06F 2206/1514* (2013.01)

(58) Field of Classification Search
CPC ........ G06F 3/1204; G06F 3/121; G06F 3/123; G06F 3/124; G06F 3/1279; G06F 3/1226; G06F 3/1281; G06F 3/1282; H04N 1/00344; H04N 1/00938; H04N 1/00965

USPC ........................................ 358/1.1–1.18, 402
See application file for complete search history.

(56) References Cited

U.S. PATENT DOCUMENTS

| | | | |
|---|---|---|---|
| 6,657,741 B1* | 12/2003 | Barry ..................... | B41J 29/393 358/1.15 |
| 8,522,233 B2* | 8/2013 | Nakamura ................ | G06F 8/63 717/173 |
| 9,720,634 B2 | 8/2017 | Sakata et al. | |
| 2008/0120350 A1* | 5/2008 | Grabowski ....... | G06F 17/30067 |
| 2008/0137111 A1* | 6/2008 | Banton .................. | H04N 1/603 358/1.9 |
| 2008/0273550 A1* | 11/2008 | Dandekar ........... | G06F 11/0793 370/465 |

(Continued)

FOREIGN PATENT DOCUMENTS

JP       2006-268110 A    10/2006

OTHER PUBLICATIONS

Office Action issued in European Patent Office (EPO) family member Patent Appl. No. 17190327.1, dated Feb. 13, 2018.

*Primary Examiner* — Gabriel Garcia
(74) *Attorney, Agent, or Firm* — Greenblum & Bernstein, P.L.C.

(57) ABSTRACT

Upon satisfaction of a predetermined trigger condition with a first hard disk drive mounted in a first controller, a first processor executes a first common file stored in a first common file storage region and write and store a first configuration file into a first configuration file storage region. The first processor executes the first common file and the first configuration file of a first firmware program and drives a first print engine to execute a first job segment stored in a first job segment storage region.

5 Claims, 10 Drawing Sheets

(56) References Cited

U.S. PATENT DOCUMENTS

| | | | |
|---|---|---|---|
| 2012/0089753 A1* | 4/2012 | Pelis | G06F 13/385 710/39 |
| 2015/0202906 A1 | 7/2015 | Refstrup | |
| 2015/0312433 A1 | 10/2015 | Tsuji | |

\* cited by examiner

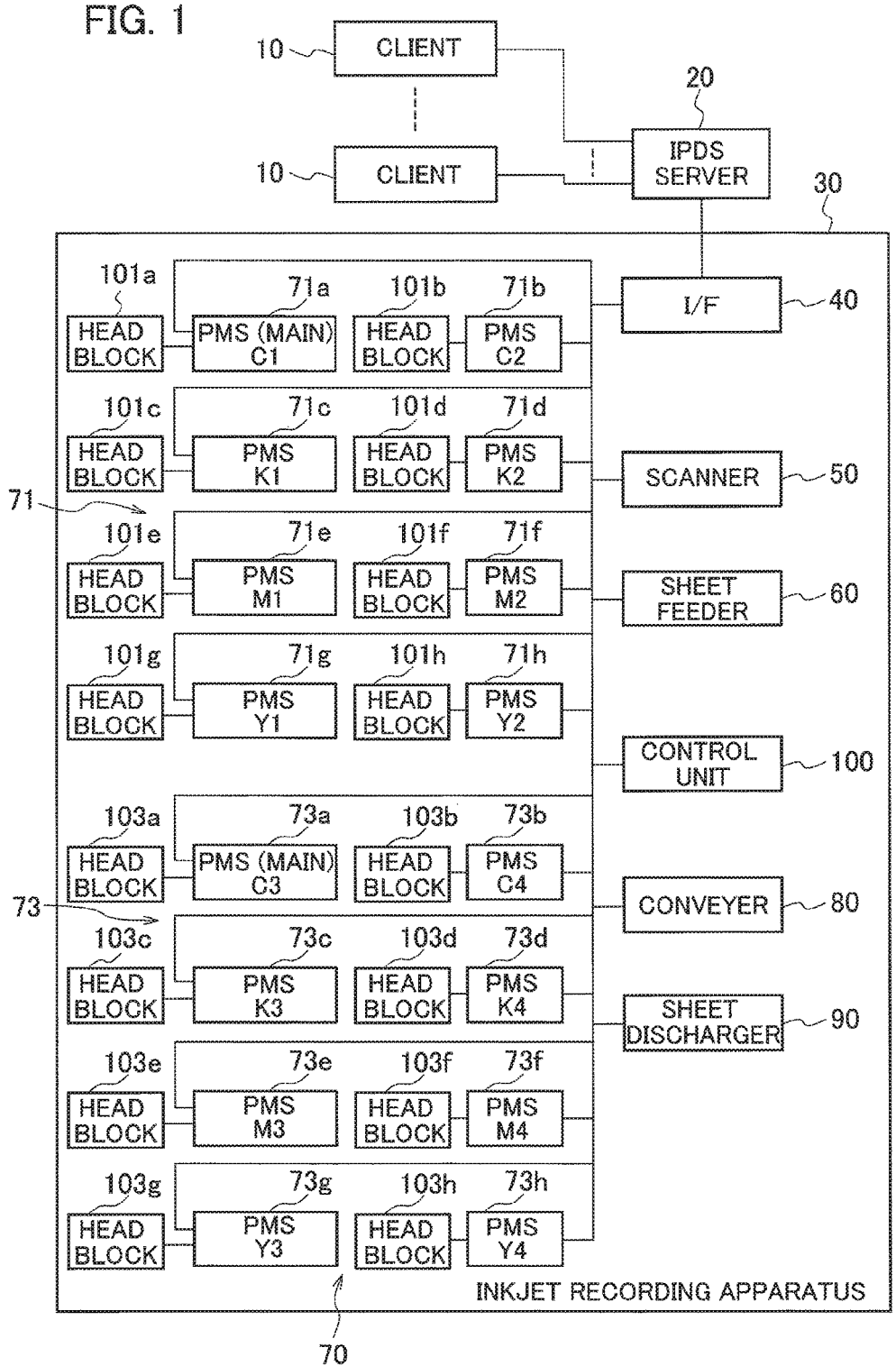

IMAGE FORMING APPARATUS WITH MULTIPLE PRINT ENGINES FOR DISTRIBUTED PROCESSING OF SINGLE PRINT JOB

CROSS REFERENCE TO RELATED APPLICATION

This application is based upon and claims the benefit of priority from the prior Japanese Patent Application No. 2016-189099, filed on Sep. 28, 2016, the entire contents of which are incorporated herein by reference.

BACKGROUND

1. Technical Field

The disclosure relates to an image forming apparatus which forms an image.

2. Related Art

Japanese Unexamined Patent Application Publication No. 2006-268110 proposes dividing a print job with a large information amount into multiple job segments and outputting the job segments in order for multiple image forming apparatuses to execute the job segments in a shared manner. Such dividing of the print job is performed also when an image forming apparatus causes multiple print engines to execute a single print job in a shared manner.

SUMMARY

The image forming apparatus which causes the multiple print engines to execute a single print job in a shared manner is provided with multiple controllers corresponding to the respective print engines. Each of the controllers executes a firmware program stored in a hard disk drive (HDD) to control operations of the corresponding print engine.

In this image forming apparatus, when any of the print engines is not normally driven, it is determined that the firmware is not normally executed, and the HDD of the controller is replaced.

An object of the disclosure is to provide an image forming apparatus in which a HDD of a controller configured to drive a print engine can be easily replaced.

Firmware of a controller corresponding to each of print engines has a common file and a configuration file. The common file is a file group of a firmware program being part of the firmware program and being common to the controllers. The configuration file is a file defining parameters of the firmware. The parameters are set depending on an inkjet head of the print engine driven by the controller. The parameters of the configuration file are set independently for each controller.

Accordingly, when the firmware including the common file and the configuration file is not normally executed and a HDD of the controller in which the firmware is stored needs to be replaced, the firmware including the configuration file for this controller should be stored in a replaced HDD.

Meanwhile, on the site of maintenance where it is impossible to predict in which one of the controllers the firmware becomes unable to normally operate, it is not preferable that the maintenance personnel is made to always carry, as HDDs for replacement, HDDs for all controllers in each of which the firmware including the configuration file for the corresponding controller is stored, so as to respond to every situation. This is because the burden on the maintenance personnel is large.

It is very meaningful to design the image formation apparatus to have a configuration that imposes less burden on a worker to remove the hard disk drive storing the firmware from the corresponding controller and replace it by a new one.

An image forming apparatus in accordance with some embodiments includes: a first print engine configured to execute a first job segment of the first job segment and a second job segment divided from a single print job; a second print engine configured to execute the second job segment; a first controller configured to control an operation of the first print engine by executing a first firmware program; and a second controller configured to control an operation of the second print engine by executing a second firmware program. The first controller includes a first processor configured to execute the first firmware program and a first hard disk drive configured to store the first firmware program. The second controller includes a second processor configured to execute the second firmware program and a second hard disk drive configured to store the second firmware program. The first hard disk drive includes: a first job segment storage region in which the first job segment is stored; a first common file storage region in which a first common file being part of the first firmware program is prestored, the first common file being common to the first controller and the second controller; and a first configuration file storage region into which a first configuration file being part of the first firmware program and defining a first setting parameter of the first print engine is written. The second hard disk drive includes: a second job segment storage region in which the second job segment is stored; a second common file storage region in which a second common file being part of the second firmware program and being the same as the first common file is prestored; and a second configuration file storage region into which a second configuration file being part of the second firmware program and defining a second setting parameter of the second print engine is written, the second setting parameter being different from the first setting parameter. Upon satisfaction of a predetermined trigger condition with the first hard disk drive mounted in the first controller, the first processor executes the first common file stored in the first common file storage region and write and store the first configuration file into the first configuration file storage region. Upon satisfaction of the predetermined trigger condition with the second hard disk drive mounted in the second controller, the second processor executes the second common file stored in the second common file storage region and writes and stores the second configuration file into the second configuration file storage region. The first processor is configured to execute the first common file and the first configuration file of the first firmware program and drive the first print engine to execute the first job segment stored in the first job segment storage region. The second processor is configured to execute the second common file and the second configuration file of the second firmware program and drive the second print engine to execute the second job segment stored in the second job segment storage region.

In the configuration described above, each of the controllers configured to control the operations of the print engines has a hard disk drive mounted therein in which the firmware to be executed by the processor of the controller is stored. The common file being the part of the firmware which is common to the controllers is prestored in the common file storage region of the hard disk drive.

Moreover, when the predetermined trigger condition is established with the hard disk drive mounted in the controller, the configuration file of the firmware for the controller is stored in the configuration file storage region of this hard disk drive. In other words, before the predetermined trigger condition is established, the configuration file storage region of the hard disk drive is yet to store the configuration file of the firmware for the controller in which the hard disk drive is mounted.

Accordingly, when one of the print engines fails to operate and a worker needs to replace the hard disk drive which is mounted in the controller corresponding to the print engine failing to operate and in which the firmware not being executed normally is stored, the hard disk drive in which no configuration file is written yet can be used as a common replacement hard disk drive for all of the controllers in which the hard disk drive is to be newly mounted, no matter which one of the print engines fails to operate.

This eliminates the necessity to prepare the hard disk drives as many as the controllers and reduces the number of hard disk drives carried by the worker in charge of the replacement work of the hard disk drives to only one, thereby reducing the burden on the worker replacing the hard disk drives.

Moreover, the print engine controlled by a controller subjected to a hard disk drive replacement is enabled to normally operate after the replacement by: replacing the hard disk drive mounted in the controller by a replacement hard disk drive; and satisfying the predetermined trigger condition with the replacement hard disk drive mounted in the controller to cause the configuration file for the controller not yet stored in the configuration file storage region before the replacement to be written and stored into the configuration file storage region.

Accordingly, the configuration described above can reduce the burden on the worker who replaces a hard disk drive, when the hard disk drive needs to be replaced because the firmware used to control the operation of the print engine and stored in the hard disk drive is not normally executable any more in the controller.

The first common file may include a first loading program and the second common file may include a second loading program being the same as the first loading program. Upon satisfaction of the predetermined trigger condition with the first hard disk drive mounted in the first controller, the first processor may execute the first loading program and write and store the first configuration file into the first configuration file storage region. Upon satisfaction of the predetermined trigger condition with the second hard disk drive mounted in the second controller, the second processor may execute the second loading program and write and store the second configuration file into the second configuration file storage region.

In the configuration described above, when the predetermined trigger condition is satisfied, the processor of the controller subjected to the hard disk drive replacement can execute the loading program in the common file and write the common file for the controller into the configuration file storage region of the hard disk drive.

The first configuration file storage region may include a first identification data storage region in which default identification data or first identification data for the first controller is stored. The default identification data may be stored in the first identification data storage region in a default state. Upon satisfaction of the predetermined trigger condition, the default identification data stored in the first identification data storage region may be updated to the first identification data inputted into the first controller from an outside of the first controller. The second configuration file storage region may include a second identification data storage region in which the default identification data or second identification data for the second controller is stored. The default identification data may be stored in the second identification data storage region in the default state. Upon satisfaction of the predetermined trigger condition, the default identification data stored in the second identification data storage region may be updated to the second identification data inputted into the second controller from an outside of the second controller.

In the configuration described above, in the default state before the satisfaction of the predetermined trigger condition with the hard disk drive mounted in the controller, the default identification data is stored instead of the identification data for each controller, in the configuration file storage region of the hard disk drive. This allows the processor of the controller to determine the replaced hard disk drive, based on the default identification data.

Moreover, when the predetermined trigger condition is satisfied after the determination of the replaced hard disk drive, the identification data for the controller subjected to the hard disk drive replacement is inputted into the controller from the outside and written into the configuration file storage region of the hard disk drive. This allows the default identification data in the configuration file storage region to be updated to the identification data for the controller subjected to the hard disk drive replacement.

The first controller may be a master controller and the second controller may be a slave controller connected to the first controller in a master-slave relationship. The first processor may be configured to: obtain a first storage content of the first configuration file in the first configuration file storage region and determine whether the first hard disk drive is replaced based on the obtained first storage content; upon determining that the first hard disk drive is replaced and upon satisfaction of the predetermined trigger condition, execute the first common file stored in the first common file storage region and write and store the first configuration file defining the first setting parameter into the first configuration file storage region; communicate with the second controller, obtain a second storage content of the second configuration file in the second configuration file storage region, and determine whether the second hard disk drive is replaced based on the obtained second storage content; and upon determining that the second hard disk drive is replaced, notify the second setting parameter for the second configuration file to the second controller. Upon satisfaction of the predetermined trigger condition, the second processor may be configured to execute the second common file stored in the second common file storage region and write and store the second configuration file defining the second setting parameter notified by the first processor into the second configuration file storage region.

In the configuration described above, one of the multiple controllers is set to be the master controller and the master controller performs communication with the controllers including itself. The master controller thereby obtains the storage content of the setting parameters in the configuration file stored in the configuration file storage region of the hard disk drive in each controller.

Then, the master controller determines the controller in which the hard disk drive is replaced, based on the obtained setting parameters, and notifies the setting parameters of the configuration file for the determined controller, to the determined controller.

Accordingly, the processor of the determined controller can execute the common file on the condition that the predetermined condition is satisfied, and thereby write the configuration file for the controller subjected to the hard disk drive replacement into the configuration file storage region of the replaced hard disk drive in this controller, the configuration file including the setting parameter notified by the master controller.

Upon receipt of the first and second job segments together with an address of an output apparatus of the first and second job segments and a same output port number outputted by a print control apparatus configured to divide the single print job into the first job segment and the second job segment and output the first and second job segments to the first and second controllers respectively from different ports, the first and second controllers may execute the job segments with the same address of the output apparatus and the same output port number as job segments belonging to a same print job.

In the configuration described above, the processors of the controllers determine whether the job segments are job segments obtained (divided) from the same print job, by determining whether the output port numbers included in the respective job segments outputted to the controllers from the print control apparatus dividing the print job match each other or not. The processors of the controllers can thereby execute the job segments obtained (divided) from the same print job as job segments belonging to the same print job.

BRIEF DESCRIPTION OF DRAWINGS

FIG. 1 is a block diagram illustrating a schematic configuration of an image forming system in a first embodiment of the present invention.

DETAILED DESCRIPTION

Figure 2A:
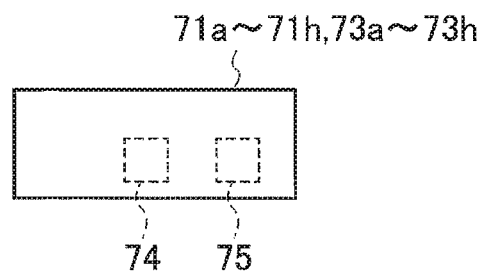
FIG. 2A is an explanatory diagram illustrating a schematic configuration of a PMS forming a printer in FIG. 1.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Description will be hereinbelow provided for embodiments of the present invention by referring to the drawings. It should be noted that the same or similar parts and components throughout the drawings will be denoted by the same or similar reference signs, and that descriptions for such parts and components will be omitted or simplified. In addition, it should be noted that the drawings are schematic and therefore different from the actual ones.

Embodiments of the present invention are described below with reference to the drawings. FIG. 1 is a block diagram illustrating a schematic configuration of an image forming system in a first embodiment of the present invention.

The image forming system of the first embodiment includes multiple clients 10, an intelligent print data stream (IPDS) server 20 which is connected to the clients 10, and an inkjet recording apparatus 30 which is an image forming apparatus connected to the IPDS server 20. The inkjet recording apparatus 30 is assumed to be an inkjet line color printer.

Each of the clients 10 generates and outputs a print job and consists of, for example, a personal computer or the like. The IPDS server 20 is a so-called print server and divides a single print job from any of the clients 10 into multiple job segments to output the job segments. The inkjet recording apparatus 30 executes the job segments from the IPDS server 20 in a shared manner. Note that, the number of IPDS servers 20 (print servers) connected to the inkjet recording apparatus 30 may be one as illustrated in FIG. 1 or two or more.

The inkjet recording apparatus 30 includes a scanner 50, a sheet feeder 60, a printer 70, a conveyer 80, a sheet discharger 90, and a control unit 100 which are connected to the IPDS server 20 through a LAN via an interface (I/F) 40, the control unit 100 configured to control the entire inkjet recording apparatus 30.

The scanner 50 scans an image from an original placed in an original placing region of a scanning portion and generates image data. The scanner 50 includes a line sensor which scans the original image, a light source which illuminates the original, a carriage on which the line sensor and the light source are mounted, a motor which conveys the carriage along an original surface, an automatic document feeder (ADF) which automatically feeds the original to the original placing region of the scanning portion, and the like (all units are not illustrated).

The sheet feeder 60 feeds a sheet (not illustrated) provided on a sheet feed tray and used for printing to the conveyer 80. The conveyer 80 conveys the sheet fed by the sheet feeder 60 to the printer 70 and then to the sheet discharger 90.

The printer 70 prints an image on one side or both sides of the sheet conveyed by the conveyer 80. The printer 70 includes line inkjet heads (print engines) configured to execute a single print job (that is, execute the job segments) in a shared manner and controllers 71, 73 for the front side and the back side configured to control ink ejection operations (image forming operations) performed by the line inkjet heads.

The line inkjet heads include an inkjet head for printing on the front side of the sheet and an inkjet head for printing on the back side of the sheet. Each of the line inkjet heads for printing on the front side and back side includes two head blocks for each of colors of CKMY which are aligned in a sheet width direction, that is in a main scanning direction orthogonal to a direction in which the conveyer 80 conveys the sheet. Specifically, the inkjet head for printing on the front side includes eight head blocks (print engines) 101*a* to 101*h*, and the inkjet head for printing on the back side includes eight head blocks (print engines) 103*a* to 103*h*.

Each of the head blocks 101*a* to 101*h* and 103*a* to 103*h* can print, on a sheet, an image with an A4 size width at maximum in the main scanning direction. Accordingly, the printer 70 can print (perform simplex printing or duplex printing of) an image with an A3 size width at maximum on the front side or the front and back sides of a sheet.

When the print job from any of the clients 10 is a print job for simplex printing in which an image is printed only on the front side of a sheet, the eight head blocks 101*a* to 101*h* forming the inkjet head for printing on the front side perform the ink ejection operations according to eight job segments received from the IPDS server 20 having divided the print job.

When the print job from any of the clients 10 is a job for duplex printing in which images are printed on the front side and the back side of the sheet, the eight head blocks 101*a* to 101*h* forming the inkjet head for printing on the front side and the eight head blocks 103*a* to 103*h* forming the inkjet head for printing on the back side perform the ink ejection operations according to 16 job segments received from the IPDS server 20 having divided the print job.

The controller 71 for the front side includes eight print management systems (PMSs) 71*a* to 71*h* which execute the job segments received from the IPDS server 20 and control the ink ejection operations of the eight head blocks 101*a* to 101*h* for printing on the front side, respectively. The controller 73 for the back side includes eight PMSs 73*a* to 73*h* which execute the job segments received from the IPDS server 20 and control the ink ejection operations of the eight head blocks 103*a* to 103*h* for printing on the back side, respectively.

The PMS 71*a* and the other PMSs 71*b* to 71*h* of the controller 71 for the front side have a master-slave relationship in which the PMS 71*a* is the master and the other PMSs 71*b* to 71*h* are the slaves, and are connected to one another through a not-illustrated communication line. Similarly, the PMS 73*a* and the other PMSs 73*b* to 73*h* of the controller 73 for the back side have a master-slave relationship in which the PMS 73*a* is the master and the other PMSs 73*b* to 73*h* are the slaves, and are connected to one another through the not-illustrated communication line.

As illustrated in FIG. 2A, each of the PMSs 71*a* to 71*h* and 73*a* to 73*h* includes a substrate and also a processor 74 and a hard disk drive 75 which are mounted on the substrate. The processors 74 of the PMSs 71*a* to 71*h* and 73*a* to 73*h* control the ink ejection operations by the head blocks 101*a* to 101*h* and 103*a* to 103*h*, respectively.

Figure 3:
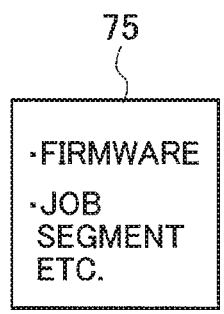
FIG. 3 is an explanatory diagram illustrating storage contents of the hard disk drive in FIGS. 2A and 2B.

As illustrated in FIG. 3, the HDDs 75 store firmware of the PMSs 71*a* to 71*h* and 73*a* to 73*h*, the job segments to be executed by the PMSs 71*a* to 71*h* and 73*a* to 73*h*, and the like.

Figure 2B:
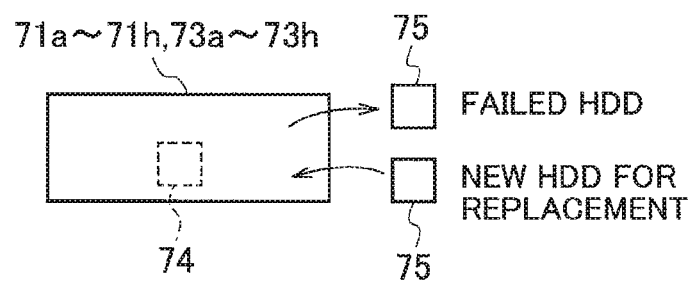
FIG. 2B is an explanatory diagram illustrating replacement of a hard disk drive performed when the PMS of FIG. 2A fails.

When any of the head blocks 101*a* to 101*h* and 103*a* to 103*h* (print engines) fails and does not operate normally, as illustrated in FIG. 2B, the corresponding HDD 75 is removed from the corresponding one of the PMSs 71*a* to 71*h* and 73*a* to 73*h* for repair and is replaced.

The firmware of each of the PMSs 71*a* to 71*h* and 73*a* to 73*h* has a common file and a configuration file. The common file is a file group of a firmware program being part of the firmware program and being common to the PMSs 71*a* to 71*h* and 73*a* to 73*h*.

The configuration file is a file being part of the firmware program and defining parameters (setting parameters) of the firmware program. The setting parameters are set depending on the inkjet heads whose operations are controlled by the PMSs 71*a* to 71*h* and 73*a* to 73*h*, and the contents of the setting parameters different among the PMSs 71*a* to 71*h* and 73*a* to 73*h*. The setting parameters include control parameters which are unique to each of the PMSs 71*a* to 71*h* and 73*a* to 73*h*.

Figure 4A:
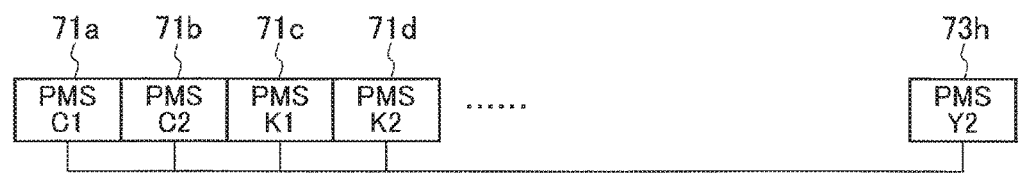
FIG. 4A is an explanatory diagram illustrating a system configuration of the PMSs in the case where the configuration file for the firmware program is stored in the HDD of each PMS together with a common file.
Figure 4B:
FIG. 4B is an explanatory diagram illustrating a configuration of the HDDs of the respective PMSs in FIG. 4A in the case where the configuration file for the firmware program is stored in the HDD of each PMS together with the common file.

Accordingly, in a system configuration in which the common file and the configuration file of the firmware are both stored in each HDD 75, as illustrated in FIG. 4B, the HDDs 75*a* to 75*p* are mounted respectively on the substrates of the PMSs 71*a* to 71*h* and 73*a* to 73*h* illustrated in FIG. 4A, and each store the configuration file including the setting parameters whose contents depend on the inkjet head to be controlled by one of the PMSs 71a to 71h and 73a to 73h corresponding to this HDD 75.

Accordingly, when the HDD 75 is to be replaced as illustrated in FIG. 2B, one of the HDDs 75a to 75p to be replaced needs to be removed from the substrate of a repair target PMS out of the PMSs 71a to 71h and 73a to 73h, and replaced by the HDD 75 in which the same configuration file as that in the removed one of the HDDs 75a to 75p is stored. If a maintenance personnel is made to always carry all types of HDDs 75a to 75p for replacement, the burden on the maintenance personnel is large.

Figure 5A:
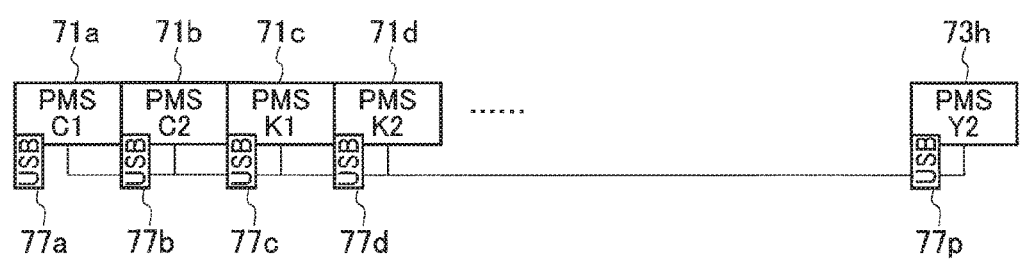
FIG. 5A is an explanatory diagram illustrating a system configuration of the PMSs in the case where the configuration file for the firmware program is stored in a USB memory connected to each PMS, separately from the common file.
Figure 5B:
FIG. 5B is an explanatory diagram illustrating a configuration of the HDD common to the PMSs in FIG. 5A in the case where the configuration file for the firmware program is stored in the USB memory connected to each PMS, separately from the common file.

It is conceivable to, instead of storing the configuration files of the firmware in the HDDs 75, store the setting parameters in USB memories 77a to 77p externally connected to the PMSs 71a to 71h and 73a to 73h, respectively, as illustrated in FIG. 5A. When the setting parameters are stored in the USB memories 77a to 77p, a common HDD 75 in which the common file is stored as illustrated in FIG. 5B is mounted on the substrates of the PMSs 71a to 71h and 73a to 73h.

Accordingly, the maintenance personnel only has to carry the common HDD 75 in which the common file is stored, as a hard disk drive used for replacement performed when any of the head blocks 101a to 101h and 103a to 103h operates abnormally. Then, the maintenance personnel can use a corresponding one of the USB memories 77a to 77p which is externally connected to the repair target PMS out of the PMSs 71a to 71h and 73a to 73h, and complete the repair.

However, after the PMSs 71a to 71h and 73a to 73h read the setting parameters corresponding thereto from the USB memories 77a to 77p connected thereto to generate the configuration files including the setting parameters and store the generated configuration files in the HDDs 75, the USB memories 77a to 77p are no longer necessary. Accordingly, it is conceivable that the USB memories 77a to 77p externally connected to the PMSs 71a to 71h and 73a to 73h are removed from the PMSs 71a to 71h and 73a to 73h after the configuration files are written into the HDDs 75.

Figure 6A:
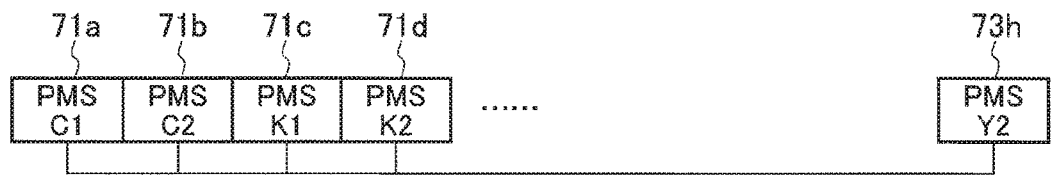
FIG. 6A is an explanatory diagram illustrating a system configuration of the PMSs in the case where the configuration file is written into the HDD of each PMS in FIGS. 5A and 5B and then the USB memory is removed from the PMS.

In this case, as illustrated in FIG. 6, none of the USB memories 77a to 77p is connected to the repair target PMS out of the PMSs 71a to 71h and 73a to 73h when the HDD 75 is to be replaced due to abnormal operation in one of the head blocks 101a to 101h and 103a to 103h (print engines).

Figure 6B:
FIG. 6B is an explanatory diagram illustrating a configuration of the HDD common to the PMSs in FIG. 6A in the case where the configuration file is written into the HDD of each PMS in FIGS. 5A and 5B and then the USB memory is removed from the PMS.

When the replacement HDD 75 which is illustrated in FIG. 6B and in which no configuration file is written yet is simply mounted in the repair target PMS out of the PMSs 71a to 71h and 73a to 73h, the repair target PMS cannot normally function.

Figure 7A:
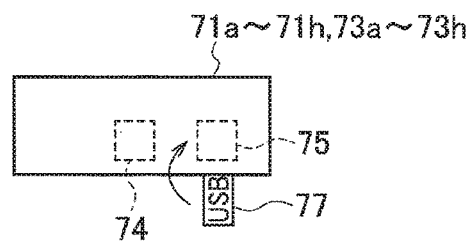
FIG. 7A is an explanatory diagram illustrating a state where the USB memory is externally connected to the PMS to write the configuration file into the HDD.

Accordingly, when the HDD 75 is replaced in the repair target PMS out of the PMSs 71a to 71h and 73a to 73h, the setting parameters for the repair target PMS out of the setting parameters for the PMSs 71a to 71h and 73a to 73h stored in a memory of a portable personal computer (not illustrated) or the like are copied to the USB memory 77 (see FIG. 7A).

Then, as illustrated in FIG. 7A, this USB memory 77 is externally connected to the repair target PMS out of the PMSs 71a to 71h and 73a to 73h in which the HDD 75 has been replaced. Next, the setting parameters stored in the USB memory 77 is read to generate the configuration file including the setting parameters, and the configuration file is written into the new HDD 75. The repair is thereby completed and the repair target PMS out of the PMSs 71a to 71h and 73a to 73h can be thus made to normally function.

Figure 7B:
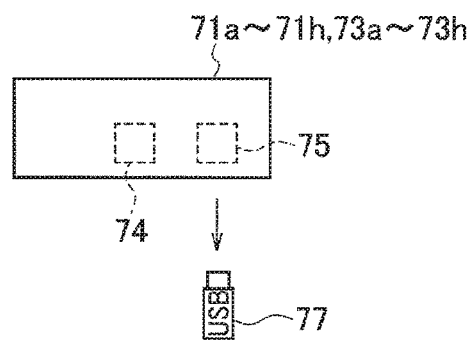
FIG. 7B is an explanatory diagram illustrating a state where the USB memory is removed from the PMS after the writing of the configuration file into the HDD.

Note that, after the setting parameters are read from the connected USB memory 77 to generate the configuration file including the setting parameters and the configuration file is written into the HDD 75, as illustrated in FIG. 7B, the USB memory 77 can be removed from the repair target PMS out of the PMSs 71a to 71h and 73a to 73h.

Generating the configuration file of the firmware including the setting parameters read from the USB memory 77 and writing it into the HDD 75 in one of the PMSs 71a to 71h and 73a to 73h in which no configuration file is written as described above enables the common HDD 75 to be used for all of the PMSs 71a to 71h and 73a to 73h in replacement performed when any of the head blocks 101a to 101h and 103a to 103h (print engines) operates abnormally.

Moreover, the number of types of HDDs 75 for replacement carried by the maintenance personnel can be reduced to one, no matter which one of the PMSs 71a to 71h and 73a to 73h is the repair target PMS.

In order to achieve such a replacement mode for the HDD 75 in the repair target PMS out of the PMSs 71a to 71h and 73a to 73h, the HDD 75 is provided with a job segment storage region where to store the job segment received from the IPDS server 20, a common file storage region where to store the common file of the firmware, and a configuration file storage region where to write the configuration file including the setting parameters read from the UBS memory 77.

The common file stored in the common file storage region of the HDD 75 includes a loading program executed when the HDD 75 in the repair target PMS out of the PMSs 71a to 71h and 73a to 73h is replaced (for example, when the inkjet recording apparatus 30 is turned on for the first time after the replacement of the HDD 75, corresponding to satisfaction of a predetermined trigger condition).

When the processor 74 of the repair target PMS out of the PMSs 71a to 71h and 73a to 73h executes the loading program, the processor 74 generates the configuration file including the setting parameters read from the USB memory 77 externally connected to the repair target PMS, and writes the configuration file into the configuration file storage region of the replaced HDD 75.

Figure 8:
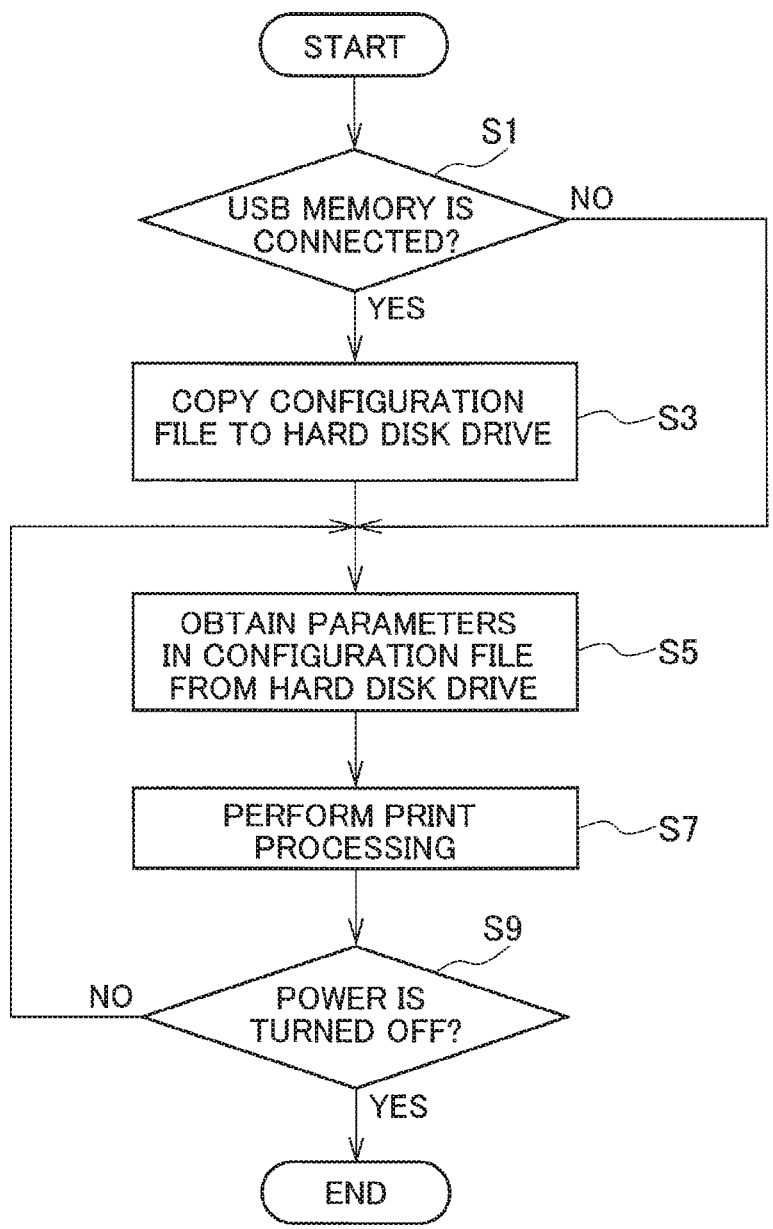
FIG. 8 is a flowchart depicting processes performed when a processor of the PMS in FIG. 7A prints an image according to the firmware program in the HDD.

With reference to the flowchart of FIG. 8, description is given of processes in which the processor 74 of each of the PMSs 71a to 71h and 73a to 73h prints an image according to the firmware program, including processes in which the processor 74 of the repair target PMS out of the PMSs 71a to 71h and 73a to 73h executing the loading program writes the configuration file including the setting parameters read from the USB memory 77 into the replaced HDD 75.

First, when the inkjet recording apparatus 30 is turned on, the processor 74 checks whether the USB memory 77 is externally connected to the corresponding one of the PMSs 71a to 71h and 73a to 73h in which the processor 74 itself is mounted (step S1). When no USB memory 77 is connected (NO in step S1), the processor 74 proceeds to step S5 to be described later. When the USB memory 77 is connected (YES in step S1), the processor 74 reads the setting parameters in the USB memory 77 to generate the configuration file including the setting parameters, writes the generated configuration file into the configuration file storage region of the HDD 75 (step S3), and then proceeds to step S5.

In step S5, the processor 74 obtains the setting parameters from the configuration file written in the configuration file storage region of the HDD 75. Then, the processor 74 executes the job segment stored in the job segment storage region of the HDD 75 by using the obtained setting parameters and the common file stored in the common file storage region of the HDD 75.

In this case, the processors 74 of the master PMSs 71a, 73a communicate with the processors 74 of the other PMSs 71b to 71h and 73b to 73h which are the slave PMSs, via the not-illustrated communication line. Then, the processors 74 of the PMSs 71a to 71h and 73a to 73h execute the job segments obtained from the same print job divided by the IPDS server 20, out of the job segments stored in the job segment storage regions of the HDDs 75. A specific method of executing the job segments is described later.

The processors 74 execute the job segments obtained (divided) from the same print job as described above in step S5, and this causes the head blocks 101a to 101h and 103a to 103h to perform processing of printing an image on a sheet according to the job segments while being controlled by the PMSs 71a to 71h and 73a to 73h (step S7).

Thereafter, the processes of step S5 and step S7 are repeated until the inkjet recording apparatus 30 is turned off (NO in step S9), so that print jobs are sequentially executed through execution of job segments obtained by dividing each of the print jobs and stored in the job segment storage regions of the HDDs 75. When the inkjet recording apparatus 30 is turned off (YES in step S9), the series of processes is terminated.

As described above, the inkjet recording apparatus 30 in the first embodiment is configured such that, in each of the PMSs 71a to 71h and 73a to 73h for the front side and the back side which execute the job segments obtained by dividing a single print job into multiple job segments, the configuration file of the firmware whose contents are different among the PMSs 71a to 71h and 73a to 73h is generated from the setting parameters read from the UBS memory 77 externally connected to this PMS, and is written into the HDD 75 in this PMS in which the common file of the firmware and the like are stored.

Accordingly, when the HDD 75 is to be replaced for repair in one of the PMSs 71a to 71h and 73a to 73h corresponding to an abnormally-operating head block out of the head blocks 101a to 101h and 103a to 103h (print engines), the HDD 75 in the repair target PMS can be replaced by the common HDD 75 in which no configuration file is written yet, no matter which one of the PMSs 71a to 71h and 73a to 73h is the repair target PMS.

Hence, the number of types of replacement hard disk drives carried by a worker in charge of the replacement work of the HDD 75 can be reduced to one, no matter which one of the PMSs 71a to 71h and 73a to 73h is the repair target PMS, and the burden on the maintenance personnel who performs the work of replacing the HDD 75 can be reduced.

Moreover, after the replacement of the HDD 75, the USB memory 77 in which the setting parameters of the configuration file for the repair target PMS out of the PMSs 71a to 71h and 73a to 73h are written is externally connected to the repair target PMS, and the repair target PMS executes the loading program in the common file to generate the configuration file from the setting parameters read from the USB memory 77 and writes the generated configuration file into the HDD 75. This can make the repaired PMS to normally function.

Figure 9:
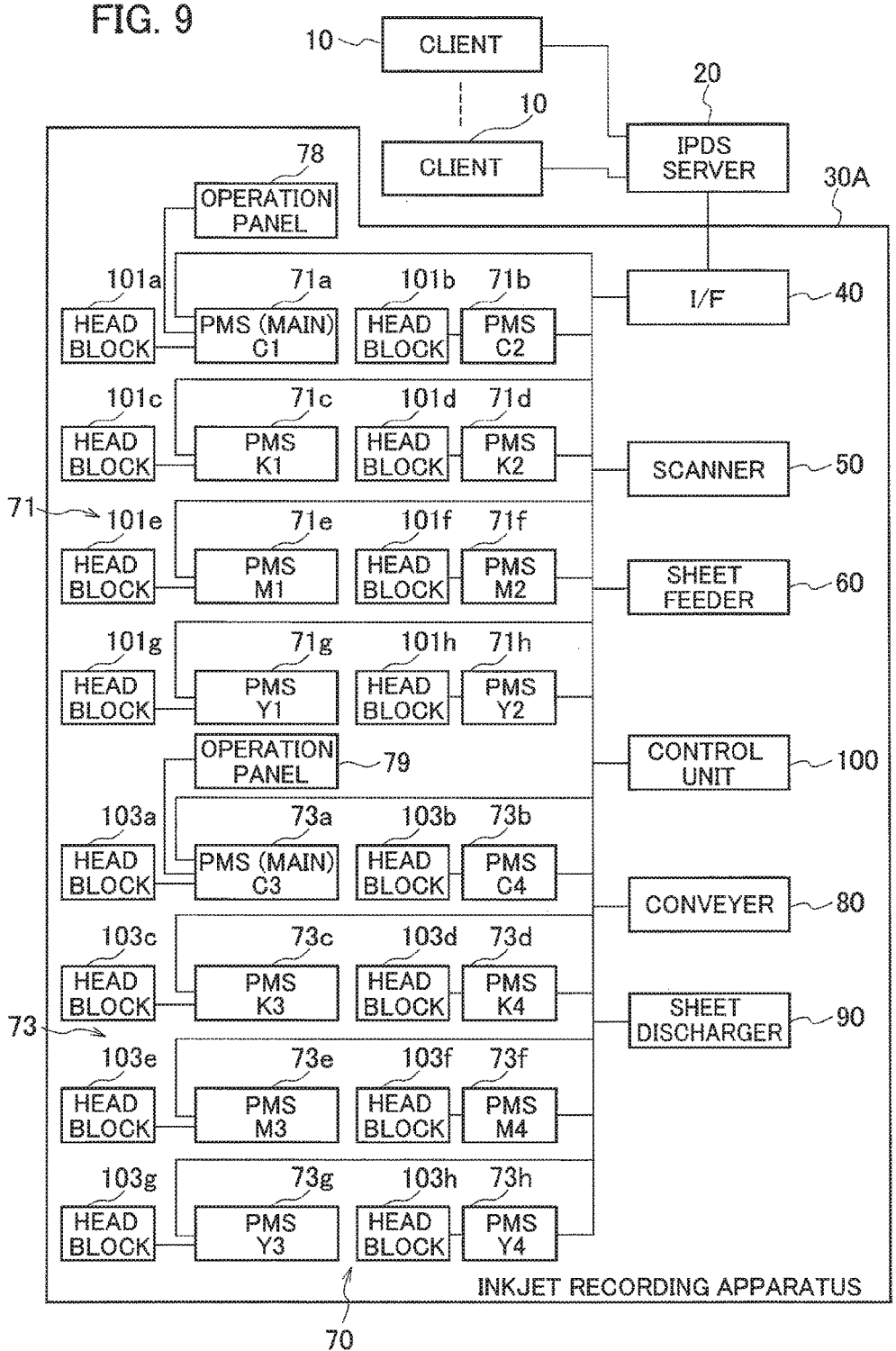
FIG. 9 is a block diagram illustrating a schematic configuration of an image forming system in a second embodiment of the present invention.

Next, description is given of an image forming system in a second embodiment of the present invention. FIG. 9 is a block diagram illustrating a schematic configuration of the image forming system of the second embodiment.

In the image forming system of the second embodiment, a printer 70A in an inkjet recording apparatus 30A is configured to be different from the printer 70 in the image forming system of the first embodiment in that operation panels 78, 79 are connected respectively to the master PMSs 71a, 73a in the controllers 71, 73 for the front side and the back side. The operation panels 78, 79 are each a man-machine interface (human-machine interface) serving also as an input-output device in which a display surface of a display is covered with a touch panel.

Moreover, in the image forming system of the second embodiment, the printer 70A is configured to be different from the printer 70 in the image forming system of the first embodiment in that the configuration file stored in the configuration file storage region of the HDD 75 (not illustrated in FIG. 9) in each of the PMSs 71a to 71h and 73a to 73h includes identification data assigned in advance to this PMS for identification.

Note that it is unknown in advance in which one of the PMSs 71a to 71h and 73a to 73h a replacement HDD 75 used to replace the HDD 75 of the repair target PMS replaces the HDD 75. Thus, dummy identification data (default identification data) different from any of pieces of identification data for the PMSs 71a to 71h and 73a to 73h is written in the configuration file storage region of the replacement HDD 75.

In the image forming system of the second embodiment, when the HDD 75 is removed from the substrate of the repair target PMS out of the PMSs 71a to 71h and 73a to 73h and replaced, a test mode is executed in response to an input on the operation panel 78, 79 to determine the repair target PMS whose HDD 75 is replaced.

In this test mode, in each of the controllers 71, 73 for the front side and the back side, the processor 74 of the master PMS 71a, 73a outputs a request to send back the identification data, via the not-illustrated communication line. The processors 74 of the slave PMSs 71b to 71h or 73b to 73h having received this request each output the identification data included in the configuration file written in the configuration file storage region of the HDD 75, via the not-illustrated communication line.

Then, the processor 74 of the master PMS 71a, 73a checks (determines) whether the pieces of identification data notified respectively by the PMSs 71a to 71h or 73a to 73h, including the piece of identification data included in the configuration file written in the configuration file storage region of the master PMS 71a, 73a itself, match the pieces of identification data assigned in advance to these PMSs 71a to 71h or 73a to 73h or not.

For this purpose, each of the master PMSs 71a, 73a is provided with an on-board memory (not illustrated) packaged on the same substrate as the processor 74, in addition to the HDD 75. The pieces of identification data assigned in advance respectively to the PMSs 71a to 71h or 73a to 73h are all written in the on-board memory.

Then, the processor 74 of the master PMS 71a, 73a determines that any of the PMSs 71a to 71h or 73a to 73h notifying the identification data which does not match any of the pieces of identification data for the PMSs 71a to 71h or 73a to 73h written in the on-board memory is the repair target PMS whose HDD 75 has been replaced.

Moreover, the processor 74 of the master PMS 71a, 73a reads, from the on-board memory, the identification data assigned in advance to the processor 74 of one of the PMSs 71a to 71h or 73a to 73h determined to be the repair target PMS and notifies the read identification data to the repair target PMS via the not-illustrated communication line, except for the case where the master PMS 71a, 73a itself is the repair target PMS.

Then, the processor 74 of one of the PMSs 71a to 71h and 73a to 73h determined to be the repair target PMS executes the common file stored in the common file storage region of the HDD 75 to generate the configuration file including the identification data notified by the processor 74 of the master PMS 71a, 73a, and writes the generated configuration file in the configuration file storage region of the HDD 75.

Note that, when the master PMS 71a, 73a itself is determined to be the repair target PMS, the processor 74 of the master PMS 71a, 73a reads the identification data assigned in advance to itself (PMS 71a, 73a) from the on-board memory.

Then, the processor 74 of the master PMS 71a, 73a executes the common file in the HDD 75 to generate the configuration file including the identification data read from the on-board memory and writes the generated configuration file into the configuration file storage region of the HDD 75.

The identification data assigned in advance to each of the PMSs 71a to 71h and 73a to 73h can be, for example, an IP address (in TCP/IP protocol) of each of the PMSs 71a to 71h and 73a to 73h on a LAN.

Figure 10:
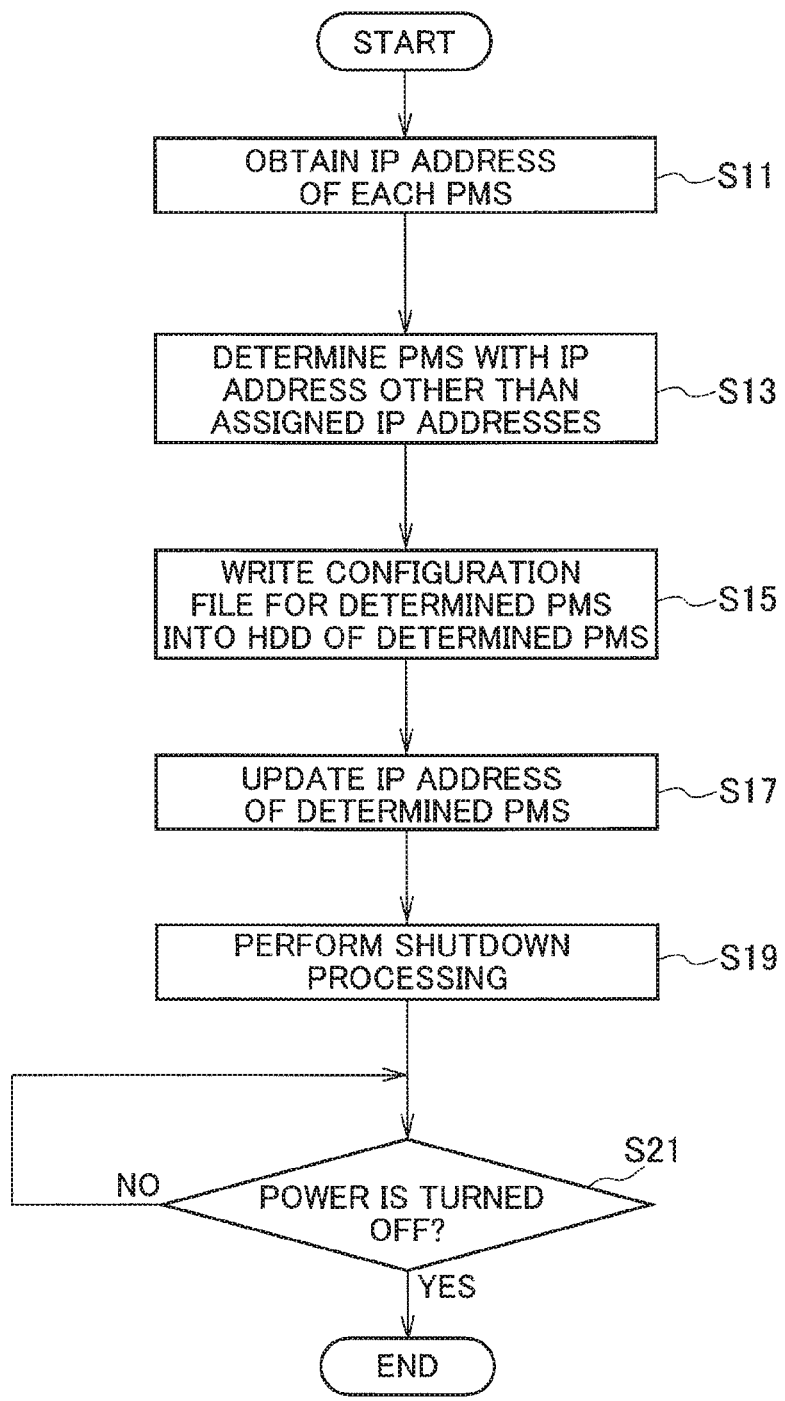
FIG. 10 is a flowchart depicting processes performed when a test mode is executed in the PMS in which the HDD is replaced out of the PMSs in FIG. 9 and the configuration file is written into a configuration file storage region of the HDD.

Next, with reference to the flowchart of FIG. 10, description is given of processes of writing the configuration file for the repair target PMS out of the PMSs 71a to 71h and 73a to 73h, into the configuration file storage region of the replaced HDD 75 which are performed in the flow described above.

First, when receiving an input to execute the test mode from the operation panel 78, 79, the processor 74 of the master PMS 71a, 73a obtains the identification data (IP address) written in the configuration file storage region of the HDD 75 in each of the PMSs 71a to 71h or 73a to 73h (step S11).

Then, the processor 74 of the master PMS 71a, 73a determines a PMS out of the PMSs 71a to 71h or 73a to 73h which has notified the identification data (IP address) matching none of the pieces of identification data (IP addresses) assigned to the respective PMSs 71a to 71h or 73a to 73h (step S13).

Next, the processor 74 of the master PMS 71a, 73a notifies the identification data having contents corresponding to the determined PMS out of the PMSs 71a to 71h or 73a to 73h, to the processor 74 of the determined PMS. Then, the processor 74 of the determined PMS out of the PMSs 71a to 71h or 73a to 73h generates the configuration file including the notified identification data and writes the generated configuration file into the configuration file region of the HDD 75 (step S15).

The processor 74 of the determined PMS out of the PMSs 71a to 71h or 73a to 73h (the PMS out of the PMSs 71a to 71h or 73a to 73h in which the HDD 75 is replaced) thus updates the identification data (IP address) in the configuration file storage region from the dummy identification data to the identification data assigned in advance to the determined PMS (step S17).

Note that the identification data used for the update may be the identification data notified by the processor 74 of the master PMS 71a, 73a in step S15 or the identification data written into the configuration file storage region of the HDD 75 and included in the configuration file in step S15.

Then, the processor 74 of the master PMS 71a, 73a performs shutdown processing to terminate the test mode (step S19) and terminates the series of processes when the inkjet recording apparatus 30 is turned off (YES in step S21).

Also in the aforementioned inkjet recording apparatus 30A of the second embodiment, as in the inkjet recording apparatus 30 of the first embodiment, when the HDD 75 is to be replaced for repair in one of the PMSs 71a to 71h and 73a to 73h corresponding to an abnormally-operating head block out of the head blocks 101a to 101h and 103a to 103h (print engines), the HDD 75 in the repair target PMS can be replaced by the common HDD 75 in which no configuration file is written yet, no matter which one of the PMSs 71a to 71h and 73a to 73h is the repair target PMS.

Moreover, in the inkjet recording apparatus 30A in the second embodiment, the dummy identification data different from any of the pieces of identification data for the respective PMSs 71a to 71h and 73a to 73h is written in the configuration file storage region of the replacement HDD 75.

Accordingly, it is possible to determine in which one of the PMSs 71a to 71h and 73a to 73h the HDD 75 is replaced, by causing the PMS in which the HDD 75 is replaced to send back the dummy identification data in response to the request from the processor 74 of the master PMS 71a, 73a and comparing the dummy identification data with the identification data for each of the PMSs 71a to 71h and 73a to 73h.

Then, the processor 74 of the master PMS 71a, 73a reads, from the on-board memory, the identification data for the repair target PMS out of the PMSs 71a to 71h or 73a to 73h in which the HDD 75 is replaced, and notifies the read identification data to the processor 74 of the repair target PMS. The processor 74 having received the notification generates the configuration file including the notified identification data and writes the generated configuration file into the configuration file storage region of the replaced HDD 75. This can make the repaired PMS to normally function.

In the inkjet recording apparatus 30A of the second embodiment, there is no need to use the USB memory 77 in which the configuration file is written in the replacement of the HDD 75 as in the inkjet recording apparatus 30 of the first embodiment, and it is possible to facilitate the work of replacing the HDD 75 for repair in any of the PMSs 71a to 71h and 73a to 73h corresponding to an abnormally-operating head block out of the head blocks 101a to 101h and 103a to 103h (print engines).

In the aforementioned image forming systems of the first and second embodiments, the print job outputted from the client 10 is divided into multiple job segments by the IPDS server 20 and the job segments are stored respectively in the job segment storage regions of the HDDs 75 in the PMSs 71a to 71h and 73a to 73h (16 PMSs at maximum) for the front side and the back side in the inkjet recording apparatus 30, 30A.

Then, the processors 74 of the PMSs 71a to 71h and 73a to 73h (16 PMSs at maximum) execute the job segments obtained (divided) from the same print job to cause the inks to be ejected from the head blocks 101a to 101h and 103a to 103h (16 head blocks at maximum) for printing on the front side and printing on the back side, and thereby print images on a sheet according to the print job in a shared manner.

In this case, the number of the IPDS servers 20 connected to the inkjet recording apparatus 30, 30A is not necessarily one. The job segments from multiple IPDS servers 20 may be stored together in the job segment storage region of the HDD 75 in each of the PMSs 71a to 71h and 73a to 73h.

Here, the PMSs 71a to 71h and 73a to 73h are connected to the multiple IPDS servers 20 through a LAN. Accordingly, the order in which the job segments from the IPDS servers 20 are stored into the HDD 75 are not necessarily the same among the PMSs 71a to 71h and 73a to 73h. In other words, the order in which the job segments from the IPDS servers 20 are stored in the HDD 75 may vary between one PMS and another PMS in the PMSs 71a to 71h and 73a to 73h.

Thus, when the job segments stored in the HDD 75 in each of the PMSs 71a to 71h and 73a to 73h are executed in the order of storage into the job segment storage region, there is a possibility that the job segments obtained by dividing the different print jobs are executed simultaneously and images are not properly printed according to the print jobs before the division.

Figure 11:
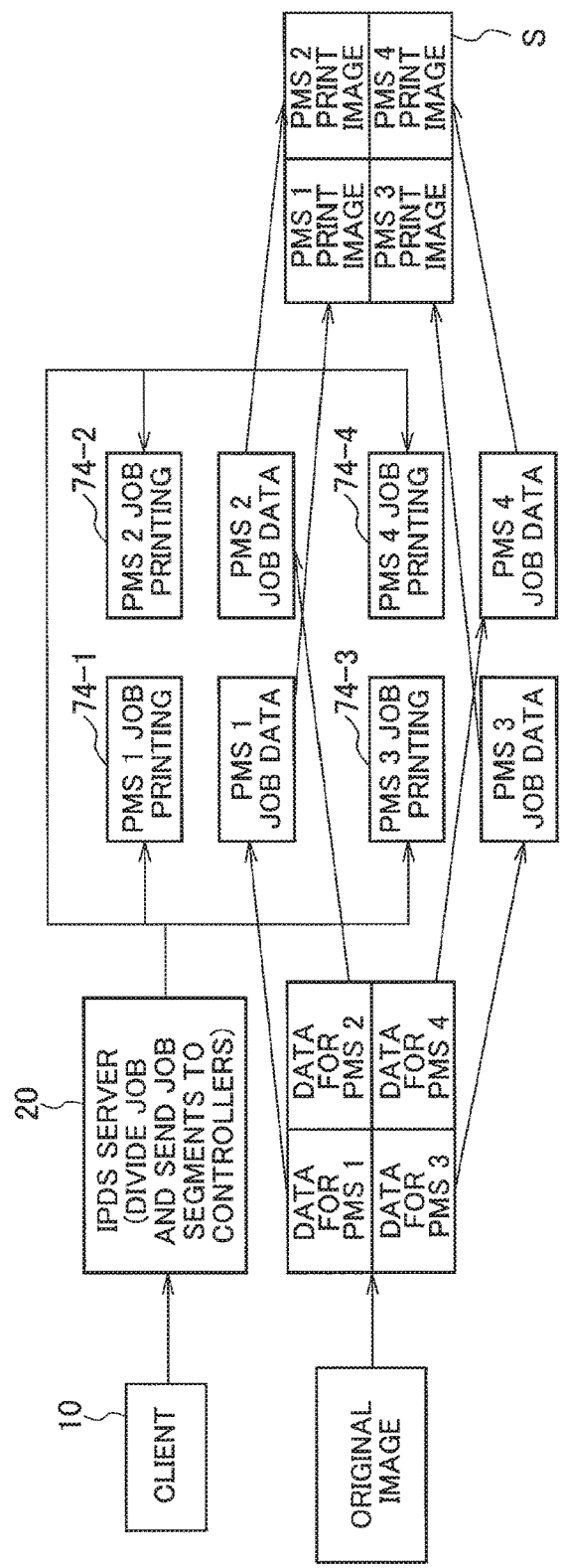
FIG. 11 is an explanatory view schematically depicting a flow of processing in which a print job from a client in FIG. 1 or 9 is divided into multiple job segments in an IPDS server and the processors in the respective PMSs in the inkjet recording apparatus execute the job segments in a shared manner to print images of the job segments on a sheet and obtain a print image of the original print job.

In view of this, as illustrated in FIG. 11, in order that the multiple head blocks 101a to 101h and 103a to 103h of the printer 70, 70A in the inkjet recording apparatus 30, 30A may print an original image of the print job from the client 10 in a shared manner, the multiple PMSs controlling the multiple head blocks 101a to 101h and 103a to 103h in the inkjet recording apparatus 30, 30A have to execute in synchronization the job segments which are sent from the IPDS server 20 having received the print job and which include data segments of the original image. The original image of the print job can be thereby reproduced on the sheet from print images formed according to the job segments executed by the respective PMSs.

Note that, in order to simplify the explanation, FIG. 11 illustrates an example in which the print job is divided into four job segments matching four PMSs of PMS 1 to PMS 4. Moreover, reference numerals 74-1 to 74-4 in FIG. 11 denote the processors of the PMS 1 to PMS 4 which execute the job segments (job data) and perform print operations (job printing) according to the data segments of the original image.

Figure 12:
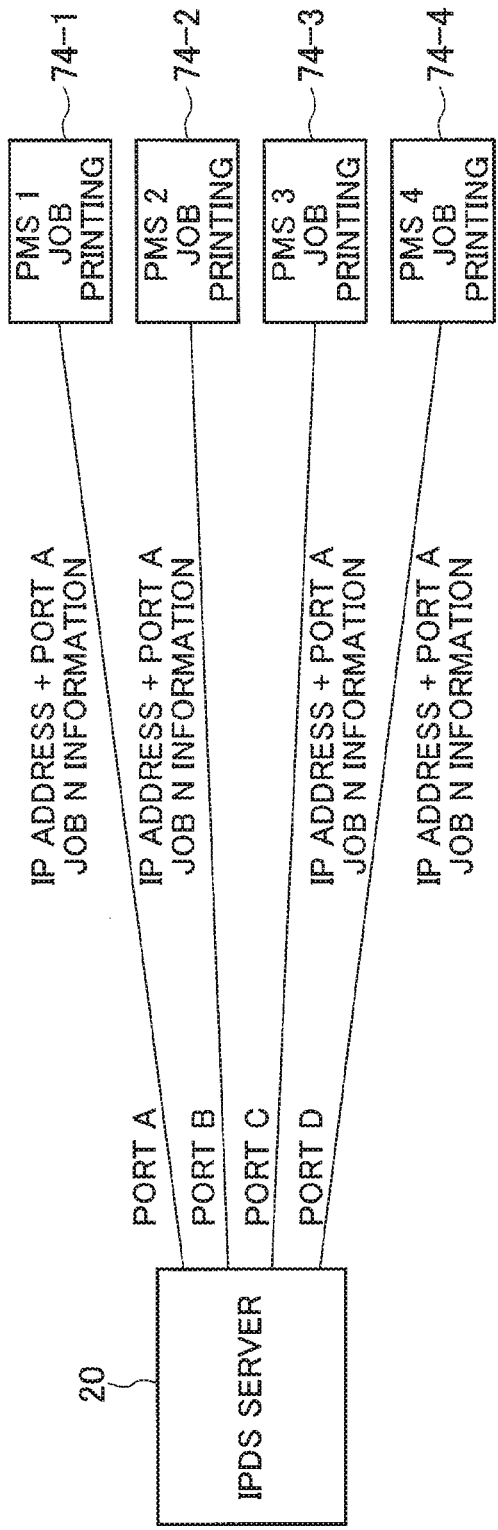
FIG. 12 is an explanatory view schematically depicting additional information added to the job segments by the IPDS server so that the inkjet recording apparatus in FIG. 1 or 9 can execute the job segments obtained (divided) from the same print job in synchronization.

Then, in order that the PMS 1 to PMS 4 may execute the job segments obtained (divided) from the same print job in synchronization, when the IPDS server 20 outputs the job segments to the PMS 1 to PMS 4 being the connection targets from ports A to D, the IPDS server 20 sets the output port numbers, added to the job segments together with the IP address of the IPDS server 20, to the same output port number as schematically illustrated in FIG. 12, instead of the output port numbers of the output ports from which the job segments are actually outputted.

Specifically, the IPDS server 20 outputs the job segments obtained (divided) from the same print job (job N) to the PMS 1 to PMS 4 from the ports A to D, while adding the IP address of the IPDS server 20 and a common output port number (port A in the example of FIG. 12) to the job segments.

Accordingly, the processors 74-1 to 74-4 of the PMS 1 to PMS 4 can extract the job segments with the same IP address and the same output port number from the job segment storage regions of the HDDs 75 by performing checking via the communication line connecting the processors 74-1 to 74-4 to one another in the master-slave relationship, and thereby execute the job segments obtained (divided) from the same print job in synchronization.

As is apparent from the aforementioned description, the IPDS server 20 includes a port number adder.

Figure 13:
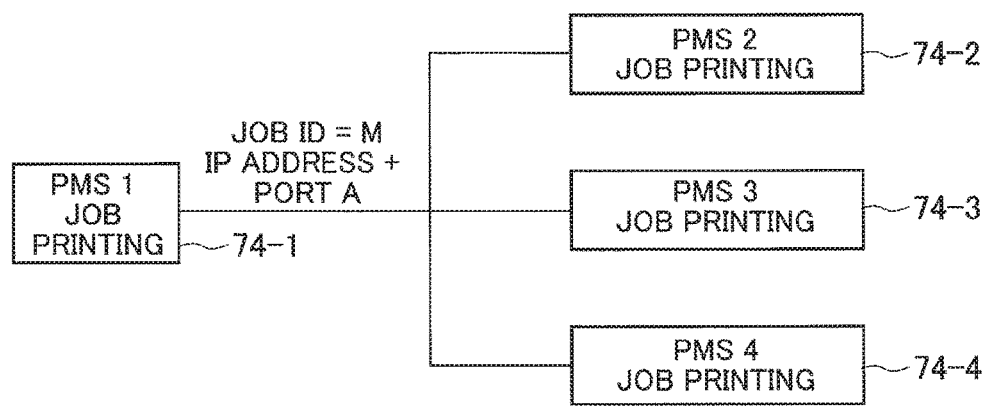
FIG. 13 is an explanatory view illustrating a process of adding a job ID to the print job determined from a combination of an IP address and an output port number added to the job segment received by a master PMS in FIG. 12.

Moreover, for example, as illustrated in FIG. 13, when the processor 74-1 of the master PMS 1 receives the job segment from the IPDS server 20 through the LAN, the processor 74-1 generates job ID=M and assigns job ID=M to a print job (job N) which can be determined from a combination of the IP address and the output port number added to the received job segment. The processor 74-1 then stores the job segment in the job segment storage region of the HDD 75.

Moreover, the processor 74-1 notifies that job ID=M is assigned to the print job (job N) which can be determined from the combination of the IP address and the output port number added to the received job segment, to the processors 74-2 to 74-4 of the slave PMS 2 to PMS 4 via the communication line connecting the processors 74-1 to 74-4 to one another in the master-slave relationship.

When the slave PMS 2 to PMS 4 receive the job segments to which the same IP address and the same output port number are added, the processors 74-2 to 74-4 of the PMS 2 to PMS 4 also assign, to the received job segments, job ID=M assigned to the divided original print job, and store the job segments in the job segment storage regions of the HDDs 75.

Figure 14:
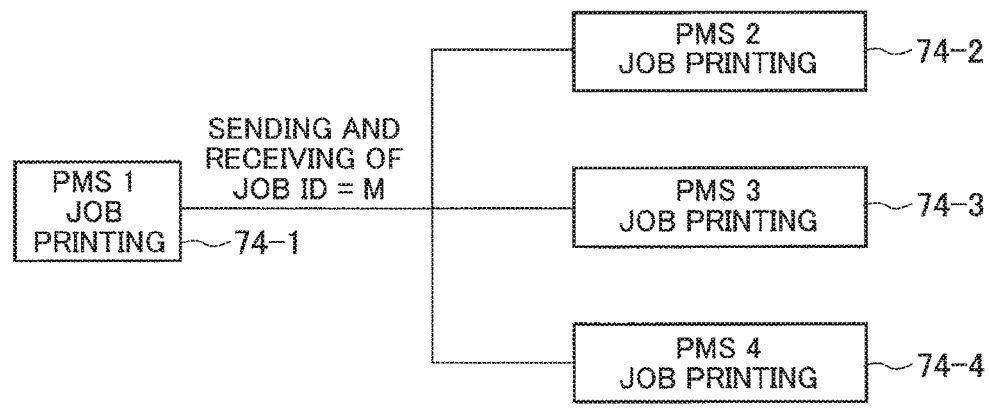
FIG. 14 is an explanatory view illustrating processes performed when the slave PMSs are made to extract, from the HDDs, the job segments obtained (divided) from the same print job from which the job segment extracted from the HDD by the master PMS in FIG. 12 is obtained.

As illustrated in FIG. 14, when executing the job segments, the processor 74-1 of the master PMS 1 notifies the job ID (=M) of the job segments to be executed, to the processors 74-2 to 74-4 of the slave PMS 2 to PMS 4 via the communication line. This allows the processors 74-1 to 74-4 to extract the job segments with job ID=M which are obtained (divided) from the same print job, from the HDDs 75 of the PMS 1 to PMS 4 and execute the job segments in synchronization.

Note that the present invention can be applied not only to an inkjet image forming apparatus but also to image forming apparatuses using other methods such as an electrophotographic method.

The image forming apparatus in each embodiment is an image forming apparatus (for example, the inkjet recording apparatus 30 in FIG. 1) including multiple controllers (for example, the controllers 71, 73 (PMSs 71a to 71h and 73a to 73h) for the front side and the back side in FIG. 1) which control operations of multiple print engines (for example, the head blocks 101a to 101h and 103a to 103h of the inkjet recording apparatus in FIG. 1) by executing a firmware program (for example, the firmware stored in the HDD 75 in FIG. 3), the multiple print engines configured to execute multiple job segments (for example, PMS 1 job data to PMS 4 job data in FIG. 11) obtained by dividing a single print job (for example, the print job of the original image in FIG. 11) in a shared manner. Each of the controllers includes a processor (for example, the processor 74 in FIGS. 2A and 2B) configured to execute the firmware program and a hard disk drive (for example, the HDD 75 in FIGS. 2A and 2B) in which the firmware is stored. The hard disk drive has a job segment storage region where to store the job segment, a common file storage region where to store a common file (for example, the common file of the firmware stored in the HDD 75 in FIG. 3) of the firmware common to the controllers, and the configuration file storage region where to write a configuration file (for example, the configuration file stored in the HDD 75 in FIG. 3) different among the controllers and defining the setting parameters of the print engine in the firmware. When a predetermined trigger condition is satisfied with the hard disk drive mounted in the controller (for example, when the inkjet recording apparatus 30 in FIG. 1 is turned on for the first time after the replacement of the HDD 75 in FIGS. 2A and 2B and the execution of the test mode is inputted from the operation panel 78, 79 in FIG. 9), the processor executes the common file and the configuration file for the controller in which the hard disk drive is mounted is thereby written and stored in the configuration file storage region. In each of the controllers, the processor executes the firmware program according to the common file and the configuration file. This causes the job segment in the job segment storage region to be executed in the print engine corresponding to the processor and the print job is thereby executed.

The common file may include a loading program (for example, the program causing the processor to execute step S3 in FIG. 8 and step S15 in FIG. 10) which is executed by the processor upon satisfaction of the predetermined trigger condition (for example, when the inkjet recording apparatus 30 in FIG. 1 is turned on for the first time after the replacement of the HDD 75 in FIGS. 2A and 2B and the execution of the test mode is inputted from the operation panel 78, 79 in FIG. 9). The processor may execute the loading program and thereby write the configuration file for the controller in which the hard disk drive is mounted, into the configuration file storage region.

The configuration file storage region may include an identification data storage region where to store identification data for the controller (for example, the identification data assigned in advance to each of the PMSs 71a to 71h and 73a to 73h in FIG. 1 for identification). Default identification data (for example, the dummy identification data stored in the new HDD 75 for replacement in FIG. 2B) may be stored in the identification data storage region in a default state. On the condition that the predetermined trigger condition is satisfied, the default identification data may be updated to the identification data for the controller inputted into the controller from the outside (for example, the USB memory 77 in FIG. 7A or the processor 74 of the master PMS 71a, 73a in FIG. 9).

One controller (for example, the PMS 1 in FIG. 13) out of the multiple controllers may be connected to the other controllers (for example, the PMS 2 to PMS 4 in FIG. 13) in a master-slave relationship. When the hard disk drive is replaced in any of the multiple controllers, the master controller may: communicate with the controllers (for example, exchange signals between the PMSs 71a, 73 and the PMSs 71b to 71h and 73b to 73h in the master-slave relationship in the process of step S11 in FIG. 10) to obtain storage contents (for example, the identification data such as the IP address on the LAN and the like of each of the PMSs 71a to 71h and 73a to 73h in FIG. 9 which are included in the configuration file written in the configuration file storage region of the HDD 75 in FIG. 3) of the setting parameters in the configuration file stored in the configuration file storage region of the hard disk in each controller (for example, the PMS 1 to PMS 4 in FIG. 13) and determine the controller in which the hard disk drive is replaced, from the obtained contents (for example, step S13 in FIG. 10); and notify the setting parameters (for example, the identification data and the parameters of the firmware notified by the processor 74 of the master PMS 71a, 73a to the processor 74 of the determined PMS out of the PMSs 71a to 71h and 73a to 73h in the process of step S15 in FIG. 10) of the configuration file for the determined controller to the determined controller; and, by notifying the setting parameters, cause the determined controller to execute the common file with the processor and write the configuration file including the notified setting parameters into the configuration file storage region on the condition that the predetermined trigger condition is satisfied (for example, step S15 in FIG. 10).

When a print control apparatus (for example, the IPDS server 20 in FIG. 1) configured to divide the single print job into multiple job segments and output the job segments to the controllers from different ports (for example, the ports A to D in FIG. 12) outputs the job segments to the controllers together with an address of the output apparatus (for example, the IP address of the IPDS server 20 in FIG. 12) of the job segments and the same output port number (for example, the port A in the job N information in FIG. 12), the controllers may execute the job segments with the same address of the output apparatus and the same output port number as job segments belonging to the same print job.

Embodiments of the present invention have been described above. However, the invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

Moreover, the effects described in the embodiments of the present invention are only a list of optimum effects achieved by the present invention. Hence, the effects of the present invention are not limited to those described in the embodiment of the present invention.

What is claimed is:

1. An image forming apparatus comprising:
   a first print engine configured to execute a first job segment of the first job segment and a second job segment divided from a single print job;
   a second print engine configured to execute the second job segment;
   a first controller configured to control an operation of the first print engine by executing a first firmware program; and
   a second controller configured to control an operation of the second print engine by executing a second firmware program, wherein
   the first controller comprises:
      a first processor configured to execute the first firmware program; and
      a first hard disk drive configured to store the first firmware program,
   the second controller includes:
      a second processor configured to execute the second firmware program; and
      a second hard disk drive configured to store the second firmware program,
   the first hard disk drive comprises:
      a first job segment storage region in which the first job segment is stored;
      a first common file storage region in which a first common file being part of the first firmware program is prestored, the first common file being common to the first controller and the second controller; and
      a first configuration file storage region into which a first configuration file being part of the first firmware program and defining a first setting parameter of the first print engine is written,
   the second hard disk drive comprises:
      a second job segment storage region in which the second job segment is stored;
      a second common file storage region in which a second common file being part of the second firmware program and being the same as the first common file is prestored; and
      a second configuration file storage region into which a second configuration file being part of the second firmware program and defining a second setting parameter of the second print engine is written, the second setting parameter being different from the first setting parameter,
   upon satisfaction of a predetermined trigger condition with the first hard disk drive mounted in the first controller, the first processor executes the first common file stored in the first common file storage region and writes and stores the first configuration file into the first configuration file storage region, upon satisfaction of the predetermined trigger condition with the second hard disk drive mounted in the second controller, the second processor executes the second common file stored in the second common file storage region and writes and stores the second configuration file into the second configuration file storage region, the first processor is configured to execute the first common file and the first configuration file of the first firmware program and drive the first print engine to execute the first job segment stored in the first job segment storage region, and the second processor is configured to execute the second common file and the second configuration file of the second firmware program and drive the second print engine to execute the second job segment stored in the second job segment storage region.

2. The image forming apparatus according to claim 1, wherein the first common file includes a first loading program, the second common file includes a second loading program being the same as the first loading program, upon satisfaction of the predetermined trigger condition with the first hard disk drive mounted in the first controller, the first processor executes the first loading program and writes and stores the first configuration file into the first configuration file storage region, and upon satisfaction of the predetermined trigger condition with the second hard disk drive mounted in the second controller, the second processor executes the second loading program and writes and stores the second configuration file into the second configuration file storage region.

3. The image forming apparatus according to claim 1, wherein the first configuration file storage region comprises a first identification data storage region in which default identification data or first identification data for the first controller is stored, the default identification data is stored in the first identification data storage region in a default state, upon satisfaction of the predetermined trigger condition, the default identification data stored in the first identification data storage region is updated to the first identification data inputted into the first controller from an outside of the first controller, the second configuration file storage region comprises a second identification data storage region in which the default identification data or second identification data for the second controller is stored, the default identification data is stored in the second identification data storage region in the default state, and upon satisfaction of the predetermined trigger condition, the default identification data stored in the second identification data storage region is updated to the second identification data inputted into the second controller from an outside of the second controller.

4. The image forming apparatus according to claim 1, wherein the first controller is a master controller, the second controller is a slave controller connected to the first controller in a master-slave relationship, the first processor is configured to:
  obtain a first storage content of the first configuration file in the first configuration file storage region and determine whether the first hard disk drive is replaced based on the obtained first storage content;
  upon determining that the first hard disk drive is replaced and upon satisfaction of the predetermined trigger condition, execute the first common file stored in the first common file storage region and write and store the first configuration file defining the first setting parameter into the first configuration file storage region;
  communicate with the second controller, obtain a second storage content of the second configuration file in the second configuration file storage region, and determine whether the second hard disk drive is replaced based on the obtained second storage content; and
  upon determining that the second hard disk drive is replaced, notify the second setting parameter for the second configuration file to the second controller, and upon satisfaction of the predetermined trigger condition, the second processor is configured to execute the second common file stored in the second common file storage region and write and store the second configuration file defining the second setting parameter notified by the first processor into the second configuration file storage region.

5. The image forming apparatus according to claim 1, wherein, upon receipt of the first and second job segments together with an address of an output apparatus of the first and second job segments and a same output port number outputted by a print control apparatus configured to divide the single print job into the first job segment and the second job segment and output the first and second job segments to the first and second controllers respectively from different ports, the first and second controllers execute the job segments with the same address of the output apparatus and the same output port number as job segments belonging to a same print job.

* * * * *